(12) United States Patent
Sarnataro

(10) Patent No.: US 8,865,374 B2
(45) Date of Patent: Oct. 21, 2014

(54) HOLOGRAM APPEARING PACKAGE IMAGE

(75) Inventor: John A. Sarnataro, Melville, NY (US)

(73) Assignee: Colgate-Palmolive Company, New York, NY (US)

( * ) Notice: Subject to any disclaimer, the term of this patent is extended or adjusted under 35 U.S.C. 154(b) by 693 days.

(21) Appl. No.: 12/519,277

(22) PCT Filed: Dec. 13, 2007

(86) PCT No.: PCT/US2007/087348
§ 371 (c)(1),
(2), (4) Date: Jun. 15, 2009

(87) PCT Pub. No.: WO2008/076785
PCT Pub. Date: Jun. 26, 2008

(65) Prior Publication Data
US 2010/0040811 A1    Feb. 18, 2010

Related U.S. Application Data

(60) Provisional application No. 60/869,983, filed on Dec. 14, 2006.

(51) Int. Cl.
*G03H 1/18* (2006.01)
*B42D 25/00* (2014.01)
*B41M 3/14* (2006.01)

(52) U.S. Cl.
CPC ............ *G03H 1/18* (2013.01); *G03H 2224/02* (2013.01); *B42D 15/105* (2013.01); *B42D 2035/22* (2013.01); *G03H 2270/12* (2013.01); *G03H 2250/40* (2013.01); *B41M 3/14* (2013.01)
USPC ..................................... 430/2; 359/3; 283/86

(58) Field of Classification Search
None
See application file for complete search history.

(56) References Cited

U.S. PATENT DOCUMENTS

| 3,418,292 | A |   | 12/1968 | Muskat |
| 3,948,739 | A |   | 4/1976 | Chaudhari et al. |
| 4,933,120 | A | * | 6/1990 | D'Amato et al. ............ 264/1.34 |
| 5,003,915 | A |   | 4/1991 | D'Amato et al. |
| 5,083,850 | A |   | 1/1992 | Mallik et al. |
| 5,116,548 | A |   | 5/1992 | Mallik et al. |
| 5,155,604 | A | * | 10/1992 | Miekka et al. ..................... 359/2 |
| 5,200,253 | A | * | 4/1993 | Yamaguchi et al. ........ 428/195.1 |
| 5,411,296 | A | * | 5/1995 | Mallik ............................. 283/86 |
| 5,492,370 | A | * | 2/1996 | Chatwin et al. ............... 283/110 |
| 5,549,774 | A | * | 8/1996 | Miekka et al. ................. 156/209 |
| 5,889,598 | A |   | 3/1999 | Monaghan |
| 6,440,277 | B1 |   | 8/2002 | D'Amato |
| 6,638,386 | B2 |   | 10/2003 | Boswell et al. |
| 6,821,592 | B2 | * | 11/2004 | Rodick ........................ 428/40.1 |
| 6,979,487 | B2 |   | 12/2005 | Scarbrough et al. |
| 7,036,431 | B2 |   | 5/2006 | Dunn et al. |
| 7,063,882 | B2 |   | 6/2006 | Mossbrook et al. |
| 2006/0254445 | A1 | * | 11/2006 | Masuda ..................... 101/424.1 |
| 2006/0272534 | A1 | * | 12/2006 | Lieberman .................... 101/487 |
| 2006/0275625 | A1 |   | 12/2006 | Lieberman |
| 2007/0195387 | A1 | * | 8/2007 | Weyermann et al. ............. 359/3 |

FOREIGN PATENT DOCUMENTS

| CN | 1209590 |   | 3/1999 |
| EP | 0 677 400 A |   | 10/1995 |
| EP | 1 527 902 A |   | 5/2005 |
| EP | 1 632 362 A |   | 3/2006 |
| JP | 61-002182 | * | 1/1986 |
| JP | 02-081083 | * | 3/1990 |
| JP | 05-150703 | * | 6/1993 |
| JP | 06-055633 | * | 3/1994 |
| JP | 09-237030 | * | 9/1997 |
| JP | 10-058870 | * | 3/1998 |
| JP | 10-072795 |   | 3/1998 |
| JP | 2003-026993 |   | 1/2003 |
| JP | 2004-280081 |   | 10/2004 |
| JP | 2005-153344 | * | 6/2005 |
| JP | 2006-160321 | * | 6/2006 |
| WO | 95/26872 A |   | 10/1995 |
| WO | 98/18635 A |   | 5/1998 |
| WO | 98/41904 A |   | 9/1998 |
| WO | 2005/051675 A |   | 6/2005 |
| WO | 2006/132919 A |   | 12/2006 |

OTHER PUBLICATIONS

Dainippon Printing Co Ltd. JP 58 132271 A Aug. 6, 1983 Abstract.
International Search Report and Written Opinion for International Application No. PCT/US2007/087348 mailed on May 7, 2008.

* cited by examiner

Primary Examiner — Martin Angebranndt
(74) Attorney, Agent, or Firm — Judy W. Chung

(57) ABSTRACT

A package that has at least one hologram on its exterior surface is formed from a paper, paperboard or thermoplastic substrate material that has an inner surface and an outer surface. The outer surface has a radiation curable particulate metal containing coating. This coating is cured and zero to one or more ink containing coatings are applied to the radiation curable particulate metal containing coating in areas that are not to have a hologram. Each of these ink containing coatings are cured, and a substantially transparent radiation curable coating is applied to the areas deficient in the zero to one or more ink coatings. This substantially transparent radiation curable coating is contacted with a substantially transparent holographic shim in an area not having thereon ink containing coatings while curing radiation is applied to the substantially transparent radiation curable coating and the substantially transparent shim.

21 Claims, No Drawings

HOLOGRAM APPEARING PACKAGE IMAGE

CROSS-REFERENCE TO RELATED PATENT APPLICATIONS

The present application is a U.S. national stage application under 35 U.S.C. §371 of PCT Application No. PCT/US2007/087348, filed Dec. 13, 2007, which claims the benefit of U.S. Provisional Patent Application Ser. No. 60/869,983, filed on Dec. 14, 2006, the contents of which are hereby incorporated by reference in their entireties.

This invention is directed to a package that has a type of hologram image on at least a part of its exterior surface, and the process to produce this hologram image that has on the exterior surface of a package. More particularly, this invention is directed to producing a hologram image on paper, paperboard, plastics and related substrates that can be used to package products.

BACKGROUND OF THE INVENTION

Holograms have been used to enhance the appearance of packages for many years. They have been formed on labels and substrates that are applied to and are used as a layer on the surface of packages, such as cartons. However, the conventional hologram image on packages is expensive and usually requires the production of a hologram containing laminate film and the bonding of this film to a package surface. This requires several processing steps and costly materials. It would be more efficient and less costly to form the hologram on the packaging material in line with the printing of other image and information onto the packaging material.

In U.S. Pat. No. 5,889,598 there is disclosed the printing of a hologram onto a surface followed by the printing of another image onto the same surface. The hologram design is embossed onto the surface followed by a metallizing of the hologram design surface, in turn followed by the cutting of the surface into sheets for subsequent printing of other image and information. This process requires the subsequent metallizing of the embossed hologram design. This metallizing is by a relatively slow vapor deposition process. U.S. Pat. No. 5,003,915 discloses the forming of a hologram directly onto the desired end product paper or other sheet material. However, after the embossing of a hologram design there is a required step of metallizing the hologram surface. This could be by vapor deposition to produce a reflective film or refractive layer onto the hologram. A protective layer can be coated over this hologram. U.S. Pat. No. 6,979,487 discloses the printing of textured pattern over a substrate. A reflective ink or foil can be deposited or laminated onto this textured pattern layer. This produces an effect of depth and dimensionality. This is interesting but does not disclose the production of a hologram. This process would be inoperable to produce a holographic image. U.S. Pat. No. 6,638,386 discloses the technique of forming a holographic image or a diffraction grating image onto a composite sheet and the subsequent attachment of this sheet to a substrate. This involves the operation of separately forming the hologram on a composite sheet and applying this composite sheet onto a substrate to produce the finished hologram on a package or other item. All of these processes have the differing drawbacks. However, all are less efficient than the holograms on a package surface produced by the present processes.

The present processes produce a hologram image directly on the package surface solely through printing steps. Further, no subsequent metallizing steps are required. Such steps which usually involve the vapor deposition of a metal, such as aluminum, onto a hologram surface are relatively slow as compared to printing techniques and require specialized equipment. In the present processes a hologram image is produced on a substrate solely through the use of printing techniques and equipment.

BRIEF SUMMARY OF THE INVENTION

The present invention comprises a hologram image directly on packaging material, and the process to produce this hologram image directly on the packaging material. The process comprises having a paper, paperboard or plastic surface, which in one embodiment can be a substantially white paperboard surface, coating onto at least a part of this surface a polymeric radiation curable coating that contains a particulate metal component, curing this polymeric radiation curable coating, coating the cured polymeric radiation curable coating containing the particulate metal with a radiation curable and substantially transparent polymer coating, contacting this radiation curable substantially transparent coating with the negative of a hologram on a shim, and at least partially curing the radiation curable coating while the shim carrying the negative of the hologram is in contact with this coating. The combination of these two coatings and the negative of the hologram produce a hologram image in the areas where there also is an underlying particulate metal coating. An effective hologram image is formed by the technique of at least partially curing the substantially transparent radiation curable coating while the shim is in contact with this coating.

In a preferred embodiment a substantially white paperboard stock comprising blanks for the production of carton comprising a blank for the production of cartons is in a first step coated over at least a part of its surface with a coating that contains a particulate metal, this coating is cured, one or more image and/or information layers are then coated onto the cured particulate metal coated layer and each cured, coating these image and/or in formation layers with a substantially transparent radiation curable coating, and contacting this substantially transparent radiation curable coating with a shim that contains the negative of a hologram, and at least partially curing the radiation curable coating while the shim is in contact with the radiation curable coating. In this preferred embodiment the coatings are applied to the paperboard stock using printing techniques. A preferred technique is the use of flexographic printing. However, other commercially available printing techniques and equipment can be used.

After the paper or paperboard stock has been printed and contains the hologram it is finished by forming it into a package. The paper or paperboard stock usually will be in the form of a continuous sheet. The paper or paperboard stock can be use directly to make packages or it can be formed into cartons. To make cartons the continuous sheet will be formed into individual carton blanks. The carton blanks are shipped to the place where a product is to be packaged and placed in the magazine of a carton making and filling machine. The cartons containing a product are filled with a product, sealed and then usually placed in corrugated shipping cartons.

DETAILED DESCRIPTION OF THE INVENTION

The invention will be described now in more detail in its preferred embodiments. Modifications can be made to the hologram materials and the processes of their manufacture, however all such materials and processes will be within the concepts disclosed herein.

The substrate material on which the hologram is formed, is in the preferred embodiments, a paper material which includes various grades of paper and paperboard. However, plastics and other substrate materials can be used. When a paper, the paper material in this preferred embodiment will have a thickness of about 0.001 inch (0.00254 cm) to about 0.005 inch (0.0127 cm), and when a paperboard will have a thickness of about 0.010 inch (0.0254 cm) to about 0.050 inch (0.127 cm). Plastics and other substrate materials will have a range of thicknesses. The substrate material can be of essentially any color or hue. However, it is preferred that the substrate material be from a brown paperboard color to white. If white the whiteness of the substrate material preferably will be about TAPPI Whiteness of about 70 or better and preferably about 75 to 95. The substrate material can be a CCNB (Clay Coated News Back) recycled paperboard or an SBS (Solid Bleach White Sulfate) virgin paperboard. White or lightly colored substrate materials are preferred. The preferred processes for forming the hologram on the substrate material are printing processes such as flexographic printing processes. Flexographic printing processes have been found to be very useful. In this process the substrate material is fed to a set of rolls, usually the first set of rolls, which will coat the substrate material with a radiation curable thermoplastic polymer composition containing a particulate metal having a particle size of about 5 to 40 microns, and preferably about 10 to 25 microns. The useful particulate metals include aluminum, silver and zinc. These are applied using a solvent/polymer carrier mixture. Useful coating compositions are ULTRASTAR UV FP-8209 flexo silver having a particulate metal content of 3.25% applied using a 200 to 300 analox flexo roller. Another useful coating composition is ULTRASTAR UV SP-8700 screen print silver having a pigment content of 2.5% applied using a Rotomesh 150 to 250 line mesh screen. The analox flexo roller will deposit a wet polymer film coating of about 2 to 12 microns while the Rotomesh screen will deposit a wet polymer film coating of about 12 to 20 microns. In general a wet film coating of about 1 to 40 microns will be useful. The viscosity of the polymer coating products will be about 150 to 350 cps. The UTRASTAR products are available from Eckhart America LP of Painsville, Ohio. This coating can be over the entire surface of the substrate material, but for reasons of economy it only will be in the areas that are to contain a hologram. This usually will be less than 50% of the substrate material surface.

Prior to the application of the radiation curable thermoplastic containing the particulate metal, a primer can be applied to the material substrate which usually will be a paper or a paperboard. This will seal the substrate material and provide a better base for the radiation curable thermoplastic polymer containing the particulate metal. This primer coating can be a water based acrylic lacquer. Also useful in place of a primer is a lamination of a polyethylene terephthalate (PET) film which can have a white surface of a TAPPI Whiteness of about 75 to 95.

After the application and radiation curing of the radiation curable thermoplastic polymer containing the particulate metal the substrate can be printed with image and information material. The radiation curing usually will be through the use of commonly used 300 watt ultraviolet lamps. They will be chosen emit a range of wavelengths depending on the polymers to be set. Electron beam radiation also can be used. However, ultraviolet radiation is preferred. The printing with image and information material, if to be used, usually will be in a number of printing steps since different printing rolls will be required for each image color. The inks used will preferably be ultraviolet curing inks which can be cured within seconds using 300 watt ultraviolet lamps. The substrate material is not printed with image and information material in the areas where there is to be a hologram. The cured metal coating will be exposed in these areas. This is needed for the application of an effective hologram in a subsequent step.

In a next step the substrate material with the above cured coatings is coated with a substantially transparent radiation curable coating. This preferably is a high gloss coating and is 100% radiation curable. The viscosity will be in the range of about 150 to 350 cps. The application weight is about 0.04 lbs (18.1 gms.) to about 0.12 lbs (54.4 gms) per 1000 square feet (93 sq.m). A useful coating material is CORKCURE 1093RHG-10 from Cork Industries, Inc. in Foxcroft, Pa. This is an ultra high gloss, solvent-less coating for lithographic and flexographic coating equipment. It is a 100% ultraviolet radiation curable coating having a viscosity of 210(+/−20) cps. It is applied to the substrate material at a last set of flexographic rolls. It is applied at a weight of 0.06 lbs (27.2 gms.) to 0.09 lbs (41 gms) per 1000 square feet (93 sq.m). It is curable at 150 feet per minute using a 300 watt ultraviolet source. Just subsequent to the substrate material being coated, and prior to the coating being cured, the coating is contacted with the negative of a hologram. This negative of a hologram is a micro-grid which is on a shim that is a part of the flexographic roll, which usually is the final roll. There can be more than one shim. The shim is a substantially transparent plastic, such as a thermoplastic. A useful material for the shim is polypropylene. However, other substantially transparent polymeric materials such as polyethylene terephthalate can be used. The substantially transparent radiation curable coating is at least partially cured when the shim is in contact with this coating, with the curing bring completed just after contact with this coating. There can be a protective coating over the coating containing the hologram as long as the hologram is not affected.

Assuming that the coated and hologram containing substrate material is to be used to make packaging cartons the decorative substrate material from the printing operations is then fed to a carton blank forming machine. This machine forms carton blanks by cutting the substrate material to length and trimming the edges to form the foldable flaps. Weakened fold points to fold the panels and end foldable flaps into a carton also are formed. The foldable flaps form the ends of the carton. These carton blanks can be loaded into the magazine of a carton forming machine which is in-line with the equipment making the primary package that is to be packaged in the carton. The primary package can be a tube, bottle or any other container, or the product itself if the product is a solid. This has been found to be useful in the packaging of dentifrice products.

The primary system for UV curing is based on acrylate polymers and monomers and cured through free radical polymerization. The acrylate polymers and monomers are high boiling which reduces VOC contamination. These systems include pigments, oligomers, reactive acrylated resins, monomers that usually are multifunctional, photoinitiators and additives. The UV energy is absorbed by the photoinitiators to produce free radicals which in turn initiate the polymerization of the acrylate polymers and monomers. Useful photoinitiators include benzoin derivatives, benzil ketals, acetophenone derivatives and benzophenone. The particular acrylate systems are chosen for a particular process depending on the compatibility with other components, the speed of the cure needed, cost, and end product appearance. Useful systems for UV curing utilizing acrylate chemistry are disclosed U.S. Pat. No. 3,418,292, which is incorporated herein in its entirety by reference. Cationic curing systems also can be used. These are based on vinyl ethers and epoxy resins for the oligomers, reactive resins, and monomers. However systems based on acrylate chemistry are preferred.

Another system that can be used is electron beam curing. The compositions for electron beam curing are based on acrylate chemistry similar to the free radical induced polymerization compositions. The primary difference is that a photoinitiator is not used. The electron beam causes the acrylate double bonds to directly cleave forming free radicals which initiate the polymerization. Although fast curing and have a low odor there is the processing drawback in that the curing must be done in an oxygen free atmosphere. Oxygen inhibits free radical formation. This requires the use of an inert gas. Electron beam systems are disclosed in U.S. Pat. No. 3,948,739, which is incorporated herein in its entirety by reference.

The invention claimed is:

1. A decorated carton blank having a hologram comprising:
a substrate material having an inner surface and an outer surface;
a portion of the outer surface having a particulate metallic coating;
one or more ink coatings over the outer surface and directly upon a second portion of a portion of the metallic coating, the one or more ink coatings excluding an area of the metallic coating to leave the area of the metallic coating exposed;
a substantially transparent radiation curable coating over the one or more ink coatings; and the entire particulate metal coating and
a hologram formed in the radiation curable coating only in an area with an exposed underlying metallic coating as the radiation curable coating is being cured.

2. A decorated carton blank as in claim 1 wherein the substrate material is selected from the group consisting of a paper, paperboard or thermoplastic.

3. A decorated carton blank as in claim 2 wherein the substrate material has a substantially white surface.

4. A decorated carton blank as in claim 2 wherein the metallic coating contains a metal selected from the group consisting of aluminum, silver and zinc.

5. A decorated carton blank as in claim 1 wherein the metallic coating is a radiation curable thermoplastic coating.

6. A decorated carton blank as in claim 5 wherein the metallic coating is ultraviolet energy curable.

7. A decorated carton blank as in claim 5 wherein the metallic coating is electron beam curable.

8. A decorated carton blank as in claim 1 wherein the substantially transparent radiation curable coating is ultraviolet energy curable.

9. A decorated carton blank as in claim 5 wherein the substantially transparent radiation coating is electron beam curable.

10. A method of making a decorated package comprising;
providing a material substrate having an inner and an outer surface, the outer surface forming an outer surface of a carton,
coating a portion of the outer surface with a radiation curable coating containing a particulate metal,
curing the radiation curable coating containing the particulate metal coating by contacting the radiation curable coating containing the particulate metal with radiation,
applying one or more ink coatings directly upon a second portion of the outer surface and over a substantial portion of the radiation curable coating containing the particulate metal, excluding an area and leaving the area with of the radiation curable coating containing the particulate metal exposed, curing the one or more ink coatings,
applying a substantially transparent radiation curable coating to the surface of the one or more ink coatings, and the entire particulate metal coating
contacting the substantially transparent coating with at least one shim containing a negative of a hologram image in an area not having one or more ink containing coatings, and
at least partially curing the substantially transparent coating while the at least one shim is in contact with the substantially transparent coating to form the hologram image in the material substrate, the hologram image forming in the substantially transparent coating and only in the area with the exposed underlying metallic coating.

11. A method of making a decorated package as in claim 10 wherein the at least one shim is substantially transparent.

12. A method of making a decorated package as in claim 10 wherein the material substrate is selected from the group consisting of paper and paperboard.

13. A method of making a decorated package as in claim 12 wherein the paper material has a substantially white outer surface.

14. A method of making a decorated package as in claim 12 wherein the radiation curable coating containing the particulate metal contains a metal selected from the group consisting of aluminum, silver and zinc.

15. A method of making a decorated package as in claim 14 wherein the radiation curable coating containing the particulate metal is ultraviolet energy curable.

16. A method of making a decorated package as in claim 10 wherein the radiation curable coating containing the particulate metal is a radiation curable thermoplastic coating.

17. A method of making a decorated package as in claim 16 wherein the radiation curable coating containing the particulate metal is electron beam curable.

18. A method of making a decorated package as in claim 10 wherein the substantially transparent coating is ultraviolet energy curable.

19. A method of making a decorated package as in claim 10 wherein the substantially transparent coating is electron beam curable.

20. A method of making a decorated package as in claim 10 wherein the package is a carton and the material substrate is formed into carton blanks.

21. A method of making a decorated package as in claim 20 the carton is formed from the carton blanks by forming the carton blank into a top panel, a bottom panel and two connecting side panels, each of the top panel, bottom panel and side panels having attached end flaps, folding the top panel, the bottom panel and the connecting side panels to form a tubular structure, folding over the end flaps to form the carton.

* * * * *